United States Patent [19]
Eilers

[11] Patent Number: 5,291,291
[45] Date of Patent: Mar. 1, 1994

[54] ATV TELEVISION SYSTEM WITH REDUCED CO-CHANNEL NTSC INTERFERENCE

[75] Inventor: Carl G. Eilers, River Forest, Ill.

[73] Assignee: Zenith Electronics Corp., Glenview, Ill.

[21] Appl. No.: 865,407

[22] Filed: Apr. 8, 1992

[51] Int. Cl.$^5$ .......................... H04N 7/04; H04N 5/38
[52] U.S. Cl. ................................... 348/723; 348/469
[58] Field of Search ............... 358/167, 186, 142, 141, 358/83; H04N 5/38, 7/04

[56] References Cited
U.S. PATENT DOCUMENTS

| | | | |
|---|---|---|---|
| 5,087,975 | 2/1992 | Citta et al. | 358/186 X |
| 5,103,310 | 4/1992 | Gibson et al. | 358/142 X |
| 5,127,021 | 6/1992 | Schreiber | 358/186 X |
| 5,151,785 | 9/1992 | Citta | 358/186 X |

Primary Examiner—Victor R. Kostak

[57] ABSTRACT

A system for minimizing co-channel interference into NTSC receivers from digitally transmitted ATV signals. The NTSC receiver subjective random noise sensitivity characteristic is utilized to shape the ATV transmitter power curve. A complementary filter incorporated in ATV receivers for compensating for the shaped ATV transmitter power curve. The shaped ATV power curve emphasizes signals at the frequencies where the NTSC subjective random noise sensitivity is low and deemphasizes signals at the frequencies where the NTSC subjective sensitivity is high.

5 Claims, 3 Drawing Sheets

ATV TELEVISION SYSTEM WITH REDUCED CO-CHANNEL NTSC INTERFERENCE

CROSS REFERENCE TO RELATED APPLICATIONS

This invention is useful with television systems such as those described and claimed in copending application Ser. No. 601,169, filed Oct. 19, 1990, and Ser. No. 894,288, filed, both of which are incorporated herein by reference and assigned to Zenith Electronics Corporation, the assignee of this invention.

BACKGROUND OF THE INVENTION AND PRIOR ART

This invention relates generally to television systems and particularly to a digital television system that is operated in the same service area as a conventional NTSC type television system. The present terrestrial broadcast television system in the United States is identified as CCIR, system M. The frequency band is 6 MHz with a Nyquist slope in the receiver at the video carrier frequency. The audio carrier and the addition of the color subcarrier in the NTSC alters the frequency and power relationships of the system.

Years ago, the visual acuity, i.e. resolution ability of the human eye was investigated with respect to video images generated in CCIR, system M color systems. Subjectivity relationships were developed at viewing distances of approximately six times image height and were expressed in the form of a curve showing the relationship of visual sensitivity to noise. It is shown that the sensitivity of the human eye to noise decreases as the frequency is increased. For NTSC color, the relationship is altered in the area of the color subcarrier, i.e. around 3 MHz. The subjective characteristics of the eye's visual acuity in combination with the frequency characteristics of an NTSC television receiver are combined herein to generate a random, white, noise subjective weighting baseband curve for a CCIR, system M color receiver. This characteristic is referred to herein as NTSC receiver sensitivity. It should be borne in mind, however, that the concept includes the aspects of visual acuity of the human eye.

Proposals for a new digital high definition television system are being considered for adoption in the United States. One such system is known as a digital, spectrum-compatible, high definition television (DSC-HDTV) which is jointly sponsored by Zenith Electronics Corporation and AT&T. This high definition digital transmission system will be referred to herein as ATV, but it should be understood to encompass any digital television transmission system. Digital transmission systems have power distribution curves that are noise like, i.e. they uniformally extend over the frequency spectrum in the manner of white noise.

A major obstacle to the selection of a new television system for the United States is the existence of a vast number of NTSC receivers and corresponding transmitters which must remain operable for a significant number of years while the new system is introduced. Thus many, if not all, service areas will be subject to both ATV television signals and NTSC television signals. Clearly, measures must be taken to minimize the adverse influences of one type of signal on receivers of the other type. The present invention is directed to tailoring the ATV signal power to complement NTSC receiver sensitivity such that a higher power ATV signal is transmitted in less sensitive areas of the NTSC receiver sensitivity spectrum and a lower power ATV signal is sent in the more sensitive NTSC frequency areas. This promotes not only reduced co-channel interference from the ATV signal into the NTSC receiver, but will also enable a higher power ATV signal without detrimental co-channel interference.

OBJECTS OF THE INVENTION

A principal object of the invention is to provide an improved high definition digital television system.

A further object of the invention is to provide an ATV transmission system that minimizes co-channel interference into NTSC receivers.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
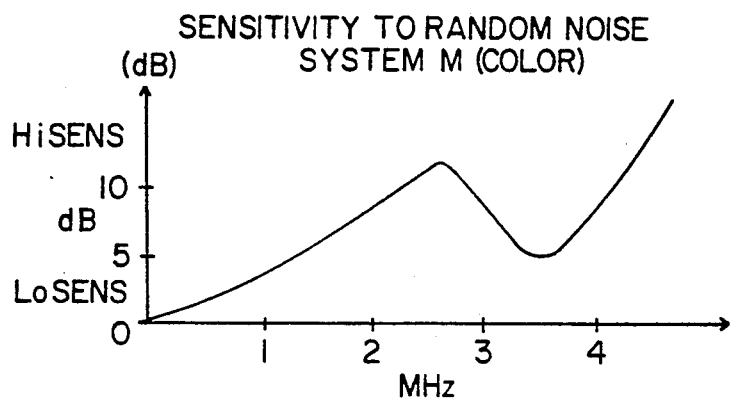
FIG. 1 is a curve showing the human eye subjective sensitivity to video signal random noise.
Figure 2:
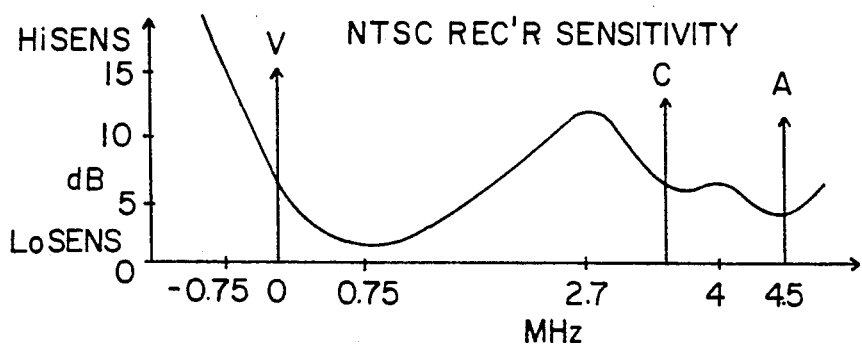
FIG. 2 depicts the equivalent curve as viewed at the RF antenna terminals of an NTSC television receiver.

Referring to the drawings, in FIG. 1 the random, white, noise sensitivity (RNS) of the human eye for a CCIR, system M color receiver for a viewer situated a distance of six times the image height is shown. The dip in the curve at about 3.5 Mhz is, as previously discussed, due to the color information in the signal. The FIG. 2 sensitivity curve is for a CCIR, system M NTSC receiver. FIG. 2 indicates the effects of the Nyquist slope in the video spectrum as well as the 3.58 MHz chroma subcarrier and the audio carrier. The chroma region is seen to be about 6 dB less sensitive than the most sensitive region, which is at 0.75 Mhz equivalent video frequency. This most sensitive region corresponds to the upper end of the double side band range of the transmitted vestigial side band signal. There are two regions of least sensitivity at about 2.7 MHz equivalent video frequency and below the visual carrier frequency.

Figure 3:
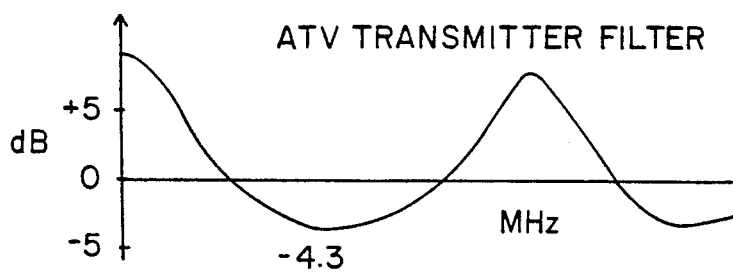
FIG. 3 shows the response curve of an ATV transmitter filter constructed in accordance with the invention.
Figure 7:
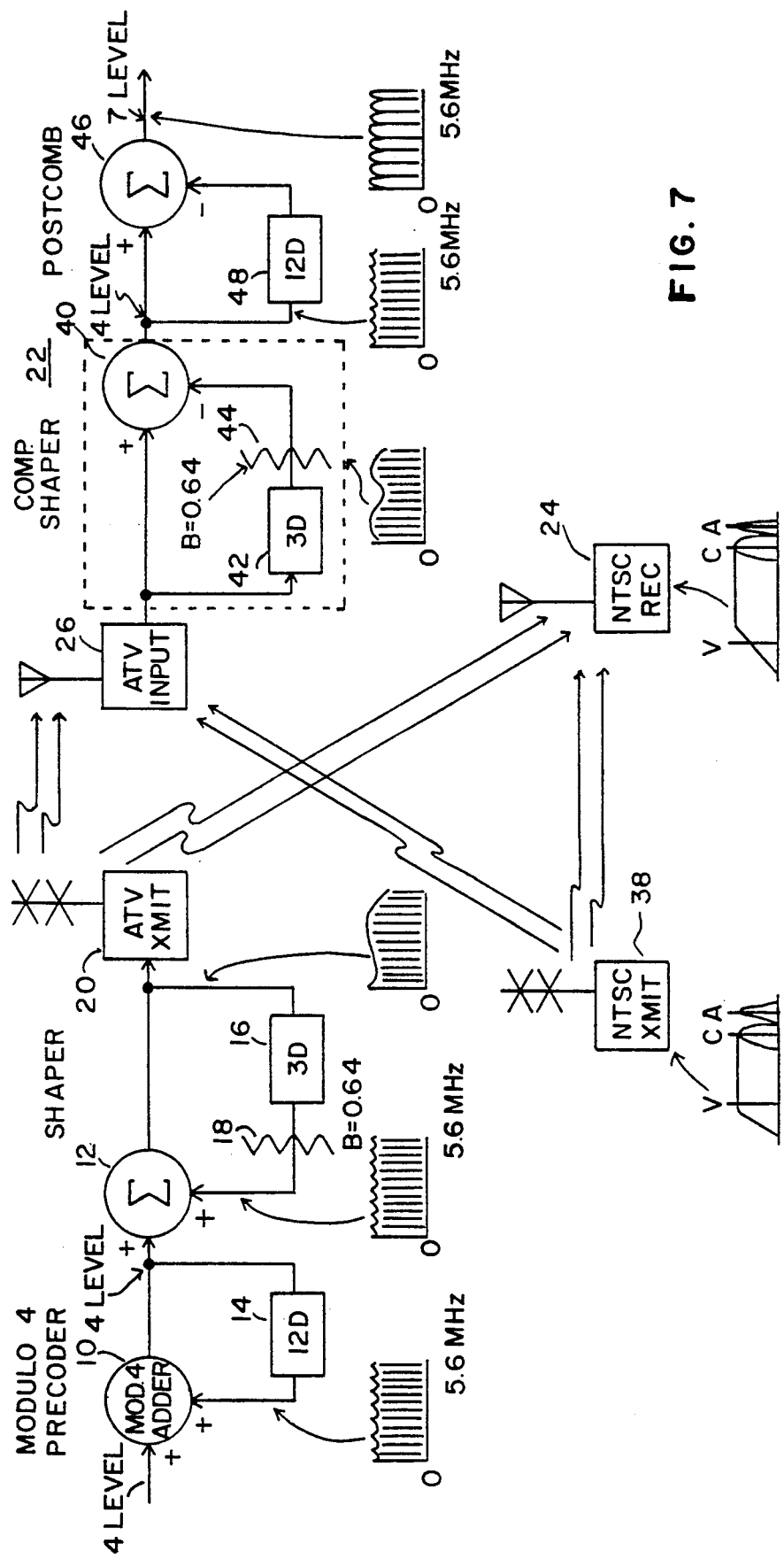
FIG. 7 is a representative ATV transmitter and receiver arrangement of the invention with overlapping NTSC and ATV signals in the service area.

In FIG. 3, the response of a filter network for raising the digital ATV power in the least sensitive regions of the FIG. 2 NTSC receiver sensitivity curve is illustrated. The filter also reduces the power in the regions of greatest sensitivity. By suitably selecting the feedback parameter in the filter, the swing (in dB) between power increase and power decrease can generally be made to match the swing (in dB) between the minimum and maximum of the NTSC receiver sensitivity curve. The filter network, as more fully disclosed in FIG. 7, is a subdued null feedback type single-tap comb filter having periodic frequency minima and maxima determined by the feedback delay. A suitable delay choice is three video symbols of the DSC-HDTV digital baseband signal described in the copending applications above.

Figure 4:
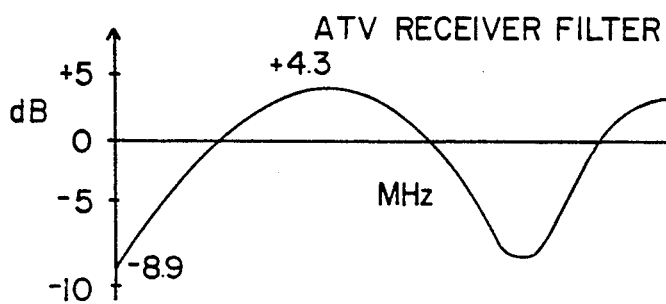
FIG. 4 shows the response curve of an ATV receiver filter constructed in accordance with the invention.

A complementary filter response in the ATV receiver is shown in FIG. 4. It should be noted that the ATV power level delivered to the circuits (not illustrated) that follow the complementary ATV filter is the same (for a unity-gain transmission path) as the input to the ATV transmitter filter as indicated at the 0 dB level. For the same subjective interference into NTSC receivers from an ATV transmitter having a flat power spectrum, the ATV transmitter having the shaped or rippled power spectrum of FIG. 3 can deliver to the circuits following the complementary filter of FIG. 4 approximately 4.3 dB more signal by increasing the overall transmitted ATV signal level by that amount. The ATV receiver filter of FIG. 4 also raises the background noise, that is the ATV receiver front end noise, by 1.5 dB so that the net ATV signal-to-noise ratio improvement is 2.8 dB. This is, of course, a significant amount and enables a wider service area for the ATV signal with no increase in interference effect on NTSC receivers.

Figure 5:
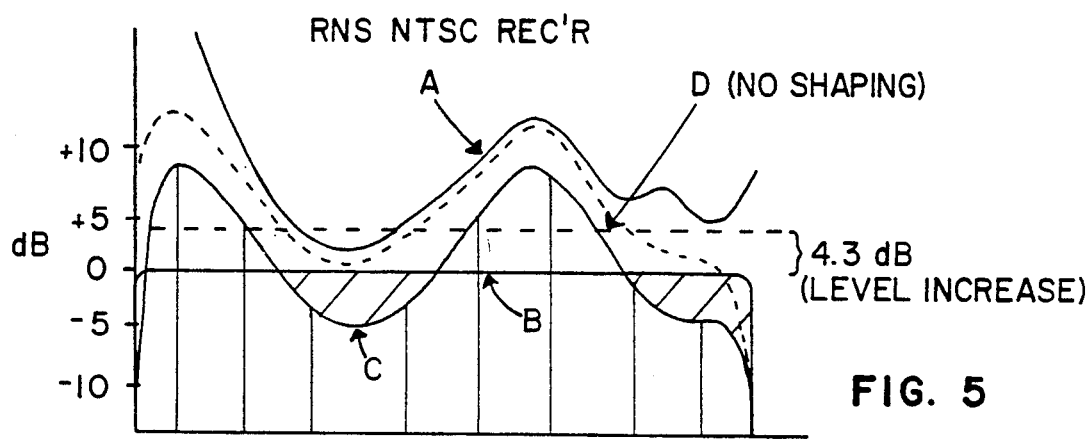
FIG. 5 is a series of curves of an ATV transmitted signal spectrum in accordance with the invention.
Figure 6:
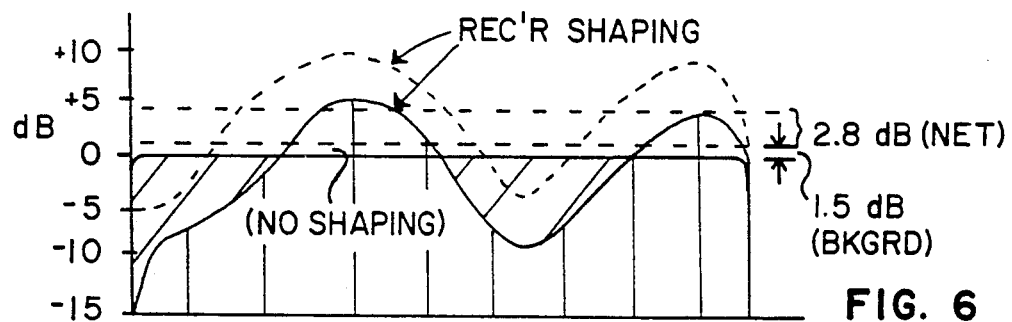
FIG. 6 is a similar series of curves of an ATV received spectrum in accordance with the invention.

FIGS. 5 and 6 illustrate this exchange or relationship between shaping the power spectrum and signal-to-noise ratio. The NTSC receiver sensitivity curve is shown superimposed on the shaped ATV transmitted spectrum. Also illustrated is the case where the ATV signal is spectrum shaped to clearly indicate the net improvement obtained with the invention.

In FIG. 7, a form of ATV transmission and reception system using Modulo 4 precoding (for complementing the NTSC interference filter in ATV receivers, as discussed in the copending applications) is shown. A 7 level video signal is supplied to an adder 10 that in turn is supplied to an adder 12 and to a 12D (12 symbol, delay 14) that is coupled back to adder 10 as shown. Adder 10 and delay 14 comprise the Modulo 4 precoder. The output of adder 12 is coupled back to its input through a 3D (three symbol) delay 16 and an attenuator 18. Adder 12, delay 16 and attenuator 18 comprise the shaper of the invention with the beta of attenuator 18 selected to be 0.64. Adder 12 supplies an ATV transmitter 20 which broadcasts signals that are received by an ATV receiver 22 and that may be received by an NTSC receiver 24. The input section 26 of ATV receiver 22 may also receive co-channel signals from an NTSC transmitter 38, which, of course, also receives signals from NTSC transmitter 38. ATV input section 36 is coupled to the positive input of an adder 40 and, through a three symbol delay element 42 and an attenuator 44 to the negative input of adder 40. Adder 40, delay 42 and attenuator 44 (with a beta of 0.64) comprise a complementary shaper to compensate for the shaping of the ATV signal in the transmitter. The output of adder 40 is coupled to the positive input of an adder 46 and through a 12 symbol delay 48 to the negative input of adder 46. Adder 46 and feed forward delay 48 comprise a postcomb circuit that converts the 4 level signals to 7 levels. The various waveforms illustrated about the circuit diagram of FIG. 7 generally indicate the frequency spectrums of the signals and the signal shaping by the respective filters in the ATV transmitter and receiver. As is fully described in the copending applications, the Modulo precoding process confines the signal output range of the precoder, which therefore precedes the transmitter shaping filter since the shaping filter increases the signal range. There is an average power increase of 2.29 dB that is attributable to the shaping process, apart from the additional 4.3 dB increase that may be realized in the ATV transmitted power. However, the only consequence is the need for the power amplifier in the ATV transmitter to handle more power. In the ATV receiver 22, the complementary filter of FIG. 4 is shown preceding the NTSC interference filter (postcomb circuit) although this order may be reversed. The advantage offered by the illustrated arrangement is that the complementary shaper filter may be combined in a channel equalizer for ghost reduction and requires only a single fixed tap of about 64%. In the future, when NTSC signal transmissions will have been entirely supplanted by ATV transmitters, the shaping filter in the ATV receiver will not be needed and the channel equalizer could automatically eliminate this complementary filter function.

The overall system neither degrades nor improves the effects of NTSC signal interference into ATV receivers since the ATV transmitter power increase is counteracted by an increase of NTSC interference caused by the complementary ATV receiver shaping filter. However, the benefit of the invention is that more transmitted ATV power, which directly results in improved ATV signal-to-noise performance, is obtainable in comparison with the arrangement of a flat ATV power spectrum.

Thus the system of the invention describes an improved ATV transmission system where more ATV signal power is available without increasing the subjective interference level into NTSC receivers. While the invention is described in connection with the particular DSC-HDTV system, it should be recognized that it is not so limited, but is equally applicable to any system where digitally transmitted television signals are co-channels with NTSC signals. The invention is to be limited only as defined in the claims.

What is claimed is:

1. A method of operating an ATV television system in the service area of an NTSC television system comprising:
   shaping the power spectrum of the ATV signal transmitter to complement the random noise subjective sensitivity of the NTSC television system receivers such that a higher power ATV signal is transmitted in less sensitive areas of the NTSC receiver sensitivity spectrum and a lower power ATV signal is sent in the more sensitive NTSC frequency areas; and
   shaping the input response characteristic of the ATV system receivers to compensate for the shaped power spectrum of the ATV signal transmitter.

2. A method of operating an ATV television system in the service area of an NTSC television system comprising:
   shaping the power spectrum of the ATV signal transmitter to complement the random noise subjective sensitivity of the NTSC television system receivers; and
   shaping the input response characteristic of the ATV system receivers to compensate for the shaped power spectrum of the ATV signal transmitter, wherein said shaping comprises:
   increasing the ATV signal power where said NTSC random noise sensitivity is low and decreasing the ATV signal power where said NTSC random noise sensitivity is high.

3. The method of claim 2 wherein said shaping is accomplished by filtering with appropriate filters.

4. The method of claim 3 further comprising Modulo N precoding the ATV signals; and
   postcombing the precoded signals received by ATV receivers for rejecting NTSC interference signals.

5. A method of operating an ATV television system in the service area of an NTSC television system with minimal co-channel interference on the receivers of each system comprising:
   Modulo N precoding the ATV signal;
   shaping the precoded ATV signal to raise its transmission power in frequency areas where the NTSC random noise subjective sensitivity is low and to reduce its transmission power in frequency areas where the NTSC random noise subjective sensitivity is high;
   postcombing the precoded signals received in ATV receivers to minimize NTSC interference; and
   shaping the ATV receiver responses to complement the shaped ATV transmitted signal power characteristic.

* * * * *